United States Patent
Budde et al.

(10) Patent No.: US 8,333,513 B2
(45) Date of Patent: Dec. 18, 2012

(54) BEARING SHELL

(75) Inventors: Frank Budde, Damme (DE);
Hans-Gerd Brunneke,
Georgsmarienhuette (DE); Martin Rechtien, Voerden (DE); Volker Grube, Diepholz (DE); Rainer Ungruh, Hoerstel (DE); Michael Rossol, Stemwede-Dielingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 952 days.

(21) Appl. No.: 11/568,638

(22) PCT Filed: May 2, 2005

(86) PCT No.: PCT/DE2005/000822
§ 371 (c)(1),
(2), (4) Date: Jun. 27, 2008

(87) PCT Pub. No.: WO2005/108806
PCT Pub. Date: Nov. 17, 2005

(65) Prior Publication Data
US 2008/0255673 A1    Oct. 16, 2008

(30) Foreign Application Priority Data
May 5, 2004   (DE) .......................... 10 2004 022 533

(51) Int. Cl.
*F16C 23/04* (2006.01)
(52) U.S. Cl. ....................................... 384/192; 384/206
(58) Field of Classification Search .................. 384/192, 384/203, 206, 208, 209–212; 403/133, 135, 403/140–143
See application file for complete search history.

(56) References Cited

U.S. PATENT DOCUMENTS

| 2,288,160 | A | * | 6/1942 | Flumerfelt | .................... | 403/129 |
| 4,701,064 | A | | 10/1987 | Mizusawa | | |
| 5,813,789 | A | * | 9/1998 | Prickler et al. | ................. | 403/135 |
| 2003/0152420 | A1 | | 8/2003 | Broeker | | |
| 2003/0180089 | A1 | * | 9/2003 | Heuser et al. | .................. | 403/135 |
| 2007/0212164 | A1 | * | 9/2007 | Bosse et al. | .................... | 403/132 |

FOREIGN PATENT DOCUMENTS

| DE | 195 45 567 A1 | 6/1997 |
| DE | 198 32 254 A1 | 1/2000 |
| DE | WO 00/26549 | 5/2000 |
| DE | 199 58 149 A1 | 6/2001 |
| DE | 102 27 014 A1 | 1/2004 |
| DE | 102 33 489 A1 | 2/2004 |
| DE | 103 46 068 A1 | 4/2005 |
| EP | 0 778 421 B1 | 6/1997 |
| JP | 59-77120 | 5/1984 |
| JP | 62082420 U | 5/1987 |
| JP | 63-195116 | 12/1988 |
| JP | 8-128439 | 5/1996 |
| JP | 11-351235 A | 12/1999 |
| JP | 2002-500320 T | 1/2002 |

* cited by examiner

*Primary Examiner* — James Pilkington
(74) *Attorney, Agent, or Firm* — McGlew and Tuttle, P.C.

(57) ABSTRACT

A bearing shell made of plastic material is provided for a ball and socket joint for mounting a ball and socket joint pivot mounted rotatably and pivotably in the bearing shell with at least two shell parts (1*a*, 1*b*) forming a bearing surface with an inner, hollow spherical shape is presented, wherein the shell parts form in their entirety the shape of a bearing ring (1) with an opening (2, 3) each arranged on the front sides of the bearing ring, which front sides are located opposite each other, at least one web (4) connecting the shell parts (1*a*, 1*b*) being arranged crosswise above one of the opening cross sections.

20 Claims, 2 Drawing Sheets

BEARING SHELL

CROSS REFERENCE TO RELATED APPLICATIONS

This application is a U.S. National Phase application of International Application PCT/DE2005/000822 and claims the benefit of priority under 35 U.S.C. §119 of German Patent Application DE 10 2004 022 533.8 filed May 5, 2004, the entire contents of which are incorporated herein by reference.

FIELD OF THE INVENTION

The present invention pertains to a bearing shell made of a plastic material for a ball and socket joint for mounting a ball and socket joint pivot rotatably and pivotably in the bearing shell.

BACKGROUND OF THE INVENTION

Ball and socket joints are used in many areas of mechanical engineering and especially in automotive engineering as components of chassis and steering assembly units. The bearing shells present in the ball and socket joints surround a so-called ball head as a component of a ball and socket joint pivot and are in turn mounted in a ball and socket joint housing. The ball and socket joint pivot and the ball and socket joint housing are arranged, on the one hand, on the chassis side or the steering side and, on the other hand, they are fixed to the body, so that motions of both components in relation to one another are made possible in certain defined degrees of freedom. The general problem in connection with the mounting of the ball and socket joints is that the bearing shell must surround the ball head located therein by more than half for securely holding the ball pivot in order to avoid an unintended separation of the bearing shell from the ball pivot. Due to the fact that the ball pivot is surrounded by the bearing shell by more than half, it is not possible to easily put together the two components. The bearing shell must rather be designed by a special design in terms of shape and/or material technology such that it can be pulled over the ball head during the mounting process and can be fixed based on its elastic properties or other design specifications in connection with the subsequent installation of the bearing shell in the ball and socket joint housing.

Two different design variants are known, for example, from DE 199 58 149 A1 for solving the problem.

On the one hand, the bearing shell may be provided with a plurality of longitudinal slots. The bearing shell itself is designed in this case such that it has essentially a hollow spherically shaped recess for receiving the ball head of the ball and socket joint pivot. This pivot is pressed into the recess through an existing introduction opening, and the area provided with the opening stretches towards the outside due to the slotted shape of the bearing shell to the extent that the ball pivot can be introduced.

Another variant of assembly arises corresponding to the document cited above from the fact that the bearing shell comprises two shell parts, which together form an inner, hollow spherically shaped bearing surface and which are connected to one another by means of a so-called film hinge and can thus be folded up for the mounting operation on the ball and socket joint pivot. After the attachment, the two shell parts are closed and again inserted into the ball and socket joint housing.

Both design variants have proved to be definitively useful for certain intended uses. However, the first embodiment, in which the bearing shell is provided with longitudinal slots, has the problem that the ball and socket joints used are usually exposed to a principal direction of load in the installed state. The forces occurring in the principal direction of load bring about high surface pressures within the bearing shell, and the slots in the bearing shell, which are necessary for the mounting, have a disadvantageous effect, because the plastic material is weakened and the remaining portions of bearing surface are subject to a correspondingly high stress. Under unfavorable operating conditions, this may cause the plastic material of the bearing shell to become subject to creep or flow motion, which means that the size of the slots will irreversibly decrease, which leads to a reduction or elimination of the prestress necessary for the absence of clearance in the ball and socket joint.

To avoid such drawbacks, the above-mentioned second design variant, in which a film hinge connects two shell parts to one another and makes it possible to fold up the bearing shell for mounting purposes, is used for certain applications.

However, it is disadvantageous in this case that only stretchable plastic materials can be used for such bearing shells, because up to 50% stretchability of the material is necessary for the film hinge to function. Plastics such as polypropylene or polyethylene are therefore used, as a rule, for such bearing shells. However, these materials lack sufficient loadability for certain applications of ball and socket joints, so that the size of the ball and socket joint may have to be increased to absorb the forces occurring.

SUMMARY OF THE INVENTION

The object of the present invention is to provide a bearing shell for a ball and socket joint, based on the problems described and the possible solutions to these problems, which have been known from the state of the art so far, such that strong forces in one load direction can also be absorbed without problems, on the one hand, and, on the other hand, the bearing shell can be manufactured easily in terms of design and mounting technology and is easy to handle.

It is essential for the present invention that the bearing shell made of plastic material for a ball and socket joint for mounting a ball and socket joint pivot mounted rotatably and pivotably in the bearing shell comprises at least two shell parts or portions. These form together, i.e., when the bearing shell is inserted into the ball and socket joint housing, an inner, hollow spherically shaped bearing surface, which is closed in itself, the shell parts forming in their entirety the shape of a bearing ring with an opening arranged on the front sides of the bearing ring, which front sides are located opposite each other, and at least one web connecting the shell part being arranged crosswise above one of the opening cross sections.

It is possible due to this novel shape to bend the two shell parts apart from each other in a defined manner by means of the web connecting same without a special stretchability being required of the plastic material being used. The fact that stretchability is not necessary also makes it possible to use high-strength and consequently relatively brittle plastics, so that even very high stresses can be absorbed and transmitted by means of small ball and socket joint variants. The web connecting the shell parts advantageously consists of an elastic plastic material, so that the shell parts will come to lie in a defined position for the further mounting steps in the joint housing or at the joint ball after the shell parts have been mounted.

Provisions are made in a special embodiment for the web connecting the shell parts to have an essentially semicircular arc-shaped bulge above the opening cross section of the bearing ring.

According to a special embodiment, the overall dimension of the bearing shell may be limited by the fact that the web has essentially a rectangular cross section, the larger side of the cross section being arranged towards the opening cross section of the bearing ring. The smaller side of the web cross section may correspond essentially to the thickness of the bearing ring. On the one hand, this measure guarantees the sufficient folding apart of the shell halves and, on the other hand, the uniform thickness of the web prevents kinking, which would cause excessive stretching of the plastic material as this occurs, for example, in case of film hinges.

In addition to the features cited, at least one projection may be arranged, moreover, as a rotation preventing element on the bearing shell at the outer edges of the bearing ring. This projection meshes with a corresponding recess of a corresponding ball and socket joint housing accommodating the bearing shell and prevents a relative motion between the ball and socket joint housing and the bearing shell.

In addition, provisions are made in an advantageous embodiment of the subject of the present invention for the bearing ring and the web to consist of plastic materials with different stretchabilities. For example, as a functional element for absorbing the necessary forces, the bearing ring may thus have a substantially lower stretchability than the plastic material of the web. Due to the corresponding selection of the materials in conjunction with the design embodiment of the web, the mobility of the half shells in relation to one another is increased without excessive stretching, as this may occur in case of film hinges. The different material compositions of the bearing ring and the web can be embodied, for example, by a co-injection process or by means of two-component processes.

It has, moreover, proved to be advantageous to make the bearing ring and optionally the web from a PEEK (polyether ether ketone) material with carbon fibers. This special material has a stretchability of only about 2% and is thus best suited for absorbing high surface pressures. In addition, fiber reinforcement, for example, one made of carbon fibers or glass fibers, can be embedded in the plastic material, which additionally increases the loadability of the bearing shell and consequently of the ball and socket joint.

Provisions are, moreover, made in another advantageous embodiment of the subject of the present invention for a narrow gap to be arranged between the shell parts in the assembled state of the bearing shell. This narrow gap is used to absorb thermal expansions, which may occur as a consequence of increased thermal load on the shell parts of the bearing shell.

Two exemplary embodiments of the subject of the present invention will be explained in greater detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
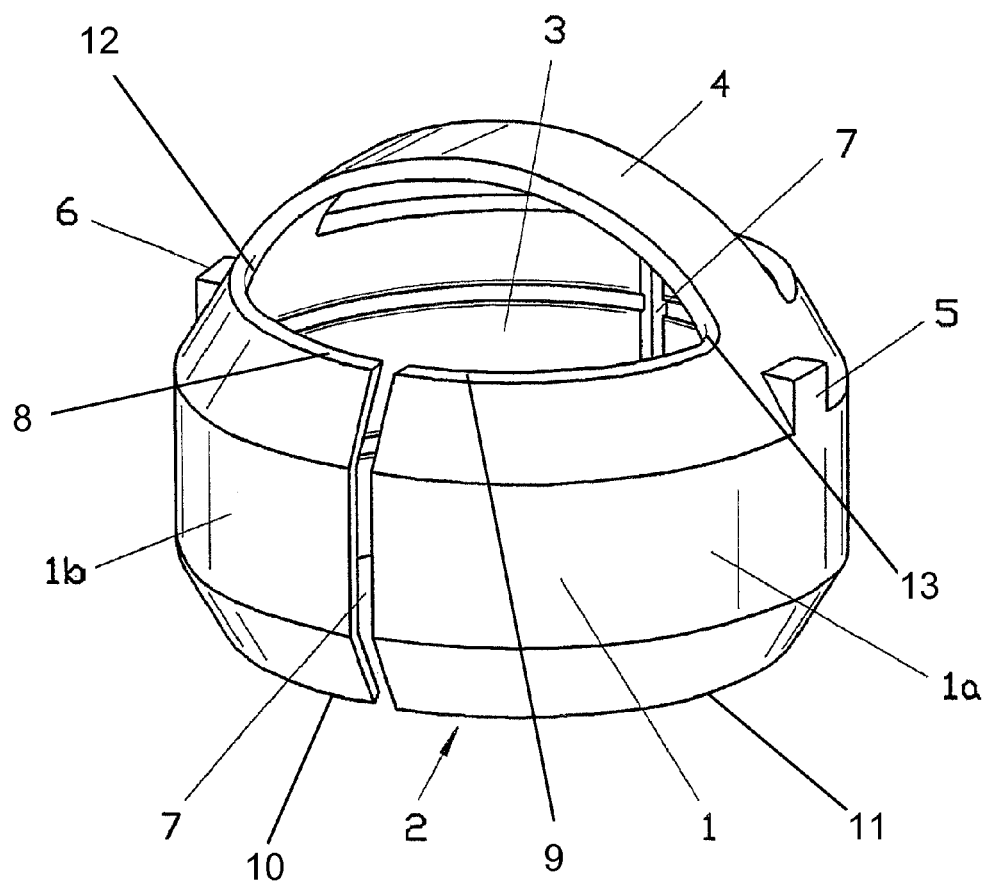
FIG. 1 is a perspective view of a bearing shell according to a first embodiment of the present invention.

Referring to the drawings in particular, it can be recognized that the bearing shell comprises essentially a bearing ring 1, which has an inner, hollow spherical segment area. An opening 3 is located on the top side of the bearing ring 1 and an opening 2 is located on the bottom side of the bearing ring 1. The opening 3 is covered by a web 4 in the exemplary embodiment being shown.

It can, furthermore, be determined from the figure that the bearing ring, which is designated by 1 as a whole and forms the bearing shell, comprises two shell parts or portions 1a and 1b. The two together form on their inner side the hollow spherically shaped bearing surface for a ball head of a ball and socket joint pin (also known as ball stud), which said ball head is to be mounted therein, the ball and socket joint pin not being the subject of the present invention and which is therefore not shown. A top edge surface 9 of one of the shell parts 1a and a top edge surface 8 of another one of the shell parts 1b define at least a portion of the opening 8. A bottom edge surface 11 of one of the shell parts 1a and a bottom edge surface 10 of another one of the shell parts 1b define the opening 2.

The web 4 connects the shell parts 1a and 1b to one another and makes possible a slight relative motion of the shell parts 1a and 1b in relation to one another, so that the bearing shell can be pulled or snapped over the ball head of a ball and socket joint pivot. One of the shell parts 1a forms an extension 13 of the web 4 and another one of the shell parts 1b forms an extension 12 of the web 4.

It can, furthermore, be determined from the figure that two projections, which mesh with corresponding recesses of a ball and socket joint housing surrounding the bearing shell and thus reliably prevent a relative motion from taking place between the bearing shell and the ball and socket joint housing, are located diametrically opposite each other on the outer contour of the bearing ring 1. As an alternative, securing against rotation can also be brought about by embedding the web 4 in a corresponding recess of a joint housing receiving the bearing shell with a corresponding cover.

The web 4 has, as is shown in the figure, a rectangular cross section, the larger side of the cross section being arranged in parallel to the opening cross section of the opening 3 of the bearing ring 1. The smaller side of the web cross section facilitates the bending of the web as a consequence of the pushing apart of the shell parts 1a and 1b.

The web 4 and the bearing ring 1 may be manufactured from different materials, for example, by a special co-injection process or multicomponent injection molding from different materials, so that a greater stretchability can be obtained for the plastic material of the web than for the bearing ring 1, which is intended to receive and transmit forces. In addition, the use-related properties of the plastic materials used can be improved by fiber reinforcements.

It can additionally be determined from the figure that a narrow gap or recess 7 is left between the shell parts 1a and 1b in the installed state of the bearing shell, which is shown. This gap is used to absorb thermal expansions, which may develop in the shell parts 1a and 1b as a consequence of high thermal load.

The explained novel design of the bearing shell according to the present invention leads especially to the advantage that high loadability of the bearing shell as a consequence of the possibility of using a highly loadable plastic material with very low stretchability is associated with the possibility of easy mounting of the bearing shell because the shell parts 1a and 1b can be pushed easily apart and the bearing shell is then pushed with the opening 2 of the bearing ring 1 over the ball head of the ball and socket joint pivot.

Figure 2:
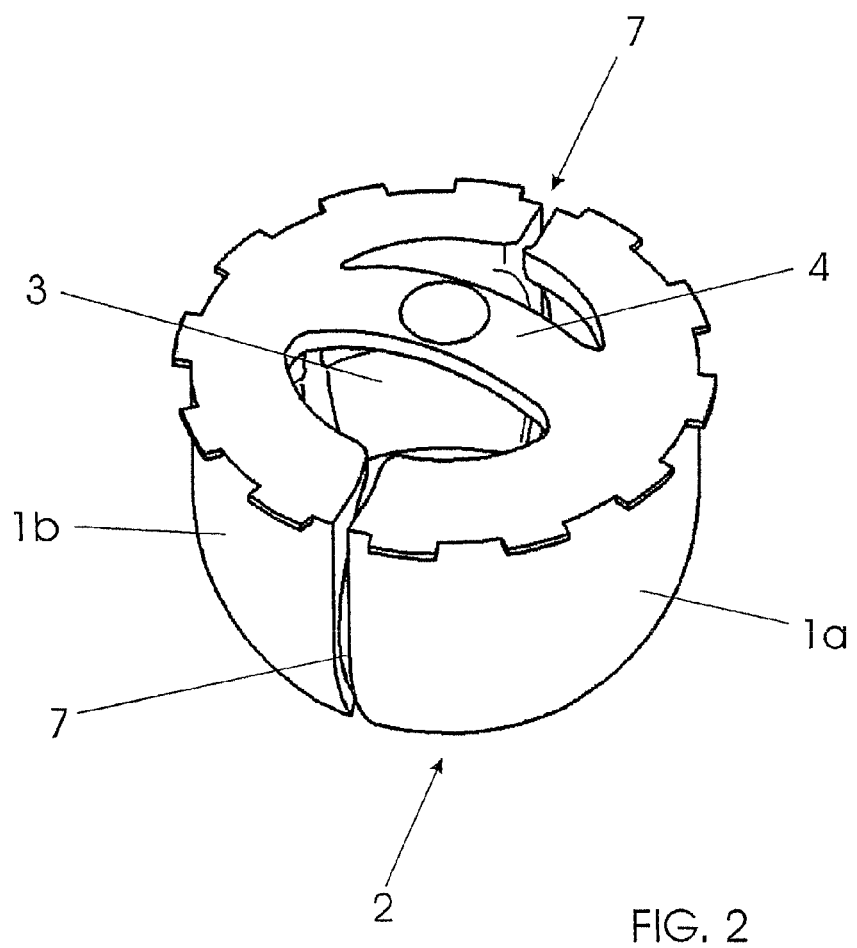
FIG. 2 is a perspective view of a bearing shell according to a first embodiment of the present invention.

FIG. 2 shows another embodiment variant of the bearing shell according to the present invention, which differs from the exemplary embodiment according to FIG. 1 especially by its outer contours. The features of the essential elements of the present invention, such as the web 4, the bearing ring 1 with the shell parts 1a and 1b as well as the openings 2 and 3 adjoining the bearing ring 1 correspond to those of the first exemplary embodiment discussed in detail with reference to FIG. 1. There are differences in the outer contour of the bearing ring 1, which has a spherical shape in the lower area facing the opening 2 in the exemplary embodiment shown in FIG. 2, whereas the upper area adjoining the spherical area is again cylindrical, as this can also be seen from the example in Example 1. In the area of the opening 3, the design variant according to FIG. 2 has a collar area, which is provided with a number of radially projecting tooth areas. The web 4 according to the present invention extends, starting from the collar-shaped area of the bearing 1, over the middle of the opening 3 analogously to the exemplary embodiment according to FIG. 1.

A gap 7, which is used, analogously to the exemplary embodiment according to FIG. 1, to compensate tolerances, is in turn located between the shell parts 1a and 1b.

While specific embodiments of the invention have been shown and described in detail to illustrate the application of the principles of the invention, it will be understood that the invention may be embodied otherwise without departing from such principles.

The invention claimed is:

1. A bearing shell made of a plastic material for a ball and socket joint for mounting a ball and socket joint pivot rotatably and pivotably in the bearing shell, the bearing shell comprising:
   two shell parts forming an inner, hollow spherically shaped bearing surface, wherein said two shell parts form in their entirety the shape of a bearing ring, said bearing ring having an opening arranged on a top side and a bottom side of the bearing ring with respect to an axial direction of said bearing ring, wherein said top side and said bottom side are located opposite each other, and a web connects each of said two shell parts, said web being arranged crosswise above a cross section of said opening on said top side.

2. A bearing shell in accordance with claim 1, wherein said web has essentially a semi-circular arc shaped cross section, each of said two shell parts comprising a top edge surface and a bottom edge surface, said top edge surface of each of said two shell parts defining at least a portion of said opening arranged on said top side of the bearing ring, said web extending over said opening arranged on said top side of the bearing ring, said bottom edge surface of each of said two shell parts defining at least a portion of said opening arranged on said bottom side of the bearing ring, said top side of the bearing ring being opposite said bottom side of the bearing ring with respect to said axial direction of said shell parts, said top edge surface of each of said two shell parts being connected to said web, wherein at least a portion of said top edge surface of each of said two shell parts form an extension of said web.

3. A bearing shell in accordance with claim 2, wherein said bearing ring and said web consist of plastic materials with different stretchabilities, each of said two shell parts defining a first recess and a second recess, each of said first recess and said second recess extending substantially in said axial direction of said two shell parts, said first recess being opposite said second recess.

4. A bearing shell in accordance with claim 3, wherein the stretchability of the plastic material of said web is greater than that of the plastic material of said bearing ring.

5. A bearing shell in accordance with claim 1, wherein said web has essentially a rectangular cross section comprising a larger side, the larger side being arranged towards said cross section of said opening of said top side of said bearing ring.

6. A bearing shell in accordance with claim 5, wherein a smaller side of the cross section of the web corresponds essentially to a thickness of said bearing ring.

7. A bearing shell in accordance with claim 1, wherein at least one projection is arranged as a rotation prevention element at the outer edges of said bearing ring.

8. A bearing shell in accordance with claim 1, wherein said web consists of an elastic plastic material.

9. A bearing shell in accordance with claim 1, wherein said bearing ring consists of PEEK material.

10. A bearing shell in accordance with claim 1, wherein fiber reinforcements are embedded in the plastic material.

11. A bearing shell in accordance with claim 1, wherein a gap is arranged between said shell parts of said bearing ring.

12. A bearing shell in accordance with claim 1, wherein said web between the shell parts is designed as a rotation prevention means for said bearing shell in a corresponding joint housing.

13. A plastic ball and socket joint bearing shell comprising:
   a first shell portion forming an inner semi-spherically shaped bearing surface, said first shell portion comprising a first shell top edge surface and a first shell bottom edge surface;
   a second shell portion forming an inner semi-spherically shaped bearing surface, said second shell portion comprising a second shell bottom edge surface and a second shell top edge surface, said first shell portion cooperating with said second shell portion to form in their entirety the shape of a bearing ring with a first opening arranged on a first side of said bearing ring and a second opening arranged on a second side of said bearing ring with respect to an axial direction of said bearing ring, said first shell top edge surface and said second shell top edge surface defining at least a portion of said first opening, said first shell bottom edge surface and said second shell bottom edge surface defining at least a portion of said second opening; and
   a web connecting said first shell portion with said second shell portion, said web being arranged crosswise above a cross section of said first opening.

14. A bearing shell in accordance with claim 13, wherein said web has essentially a rectangular cross section with a larger side facing towards said cross section of said first opening.

15. A bearing shell in accordance with claim 14, wherein a smaller side of the cross section of said web corresponds essentially to a thickness of said bearing ring.

16. A bearing shell in accordance with claim 13, wherein said web has portions with an essentially semi-circular arc shaped cross section, extending over the cross section of said first opening.

17. A bearing shell in accordance with claim 13, wherein at least one projection is arranged as a rotation prevention element at the outer edges of said bearing ring.

18. A bearing shell in accordance with claim 13, wherein said bearing ring and said web consist of plastic materials with different stretchabilities, said first shell portion and said second shell portion defining a first gap and a second gap, each of said first gap and said second gap extending substantially in said axial direction of said bearing ring, said first gap being opposite said second gap, said first opening being opposite said second opening, at least a portion of said first shell top edge surface forming at an extension of one end of said web, at least a portion of said second shell top edge surface forming an extension of another end of said web, said web being connected to said first shell top edge surface and said second shell top edge surface.

19. A bearing shell in accordance with claim 13, further comprising fiber reinforcement material embedded in plastic material of the bearing shell.

20. A bearing shell in accordance with claim 13, wherein a gap is arranged between said shell portions of said bearing ring.

* * * * *